United States Patent [19]

Petrillo et al.

[11] Patent Number: 5,001,188

[45] Date of Patent: Mar. 19, 1991

[54] PROCESS FOR PREPARING ANTIRUST COMPONENTS WITH IMPROVED FLOWABILITY AND PENETRATION

[76] Inventors: Vincenzo Petrillo, Via Piave 17, Cirie' (Torino); Gianpiero Crotti, Via Donizetti, 6, Ranica (Bergamo); Giovanni B. Marchello, Strada Privata del Bioletto, 18, Aglie' Canavese, all of Italy

[21] Appl. No.: 355,775

[22] Filed: May 23, 1989

Related U.S. Application Data

[62] Division of Ser. No. 40,575, Apr. 17, 1988, Pat. No. 4,861,824.

[30] Foreign Application Priority Data

Aug. 7, 1986 [IT] Italy ............................ 21444 A/86

[51] Int. Cl.$^5$ .............................................. C08K 5/01
[52] U.S. Cl. .................................... 524/745; 524/788; 524/700
[58] Field of Search .............................. 524/745, 788

[56] References Cited

U.S. PATENT DOCUMENTS 4,421,660 12/1983 Solo ..................................... 524/788

FOREIGN PATENT DOCUMENTS 2109393 6/1983 United Kingdom .

Primary Examiner—Joseph L. Schofer
Assistant Examiner—J. M. Reddick
Attorney, Agent, or Firm—Darby & Darby

[57] ABSTRACT

A process for preparing an antirust composition is described, particularly for underbody and already painted and finished motor vehicle parts, having improved physical and mechanical properties, which comprises: (1) preparing a reaction mixture obtained by mixing a preformed product containing an emulsifier, an organic diluent and an inorganic carbonate, with one or more monomers, water and a radicalic catalyst, (2) heating the mixture thus obtained to polymerize the monomer, and (3) further heating to vaporize water, optionally under vacuum, the polymer being formed in situ in the basic gelified composition. A method to provide better rust strength to painted parts or surfaces using the composition thus prepared is also described.

7 Claims, No Drawings

PROCESS FOR PREPARING ANTIRUST COMPONENTS WITH IMPROVED FLOWABILITY AND PENETRATION

This is a division of application Ser. No. 040,575 filed Apr. 17, 1988, now U.S. Pat. No. 4,861,824.

BACKGROUND OF THE INVENTION

1. Field of the Invention

The present invention relates to a process for preparing antirust components and, particularly, to an improved process for preparing polymer antirust components having high and controlled viscosity as well as high basicity, said components being mainly characterized by their improved flowability and capillary penetration, and by a better corrosion strength.

2. Prior art

Fat and antirust compositions with improved properties for several uses, and particularly for preventing rust in underbody and motor vehicle boxed parts, have been already described in Mc Millen, U.S. Pat. Nos. 3,242,079 and 3,372,115; in Adams, U.S. Pat. No.3,565,672, in Rogers, U.S. Pat. Nos. 3,661,622 and 3,746,643; in Hunt, U.S. Pat. No. 3,816,310 and in Italian Patent 858,289.

So U.S Pat. Nos. 3,242,079 and 3,372,115 relate particularly to compositions for the use as anticorrosive agents for metal surfaces Said compositions are obtained as fat-like compounds by reacting an alkaline-earth metal sulfonate containing a homogeneous colloidal dispersion of same metal carbonate, both being dissolved in a base flowing lubricating oil, with a hydrogen active containing compound (for example acetic acid or water-alcohol mixture) This reaction is carried out in two steps in the first step the colloidal dispersion of the alkaline-earth carbonate in oil solution of the sulfonate is obtained; whereas in the second step, after filtering, conversion of said colloidal dispersion of the alkaline-earth carbonate in oil solution of the sulfonate is obtained; whereas in the second step, after filtering, conversion of said colloidal dispersion into fat product was carried out by reacting with the water-alcohol mixture and the hydrogen active compound. According to Mc Millen, the water-alcohol mixture level (generally methanol, or an alcohol with a low carbon atoms content), referred also to as "converting mixture", requested for having the colloidal dispersion conversion, is from about 1 to about 80% by weight, based on colloidal dispersion weight.

U.S. Pat. No.3,565,672 claims the use of a composition of the above mentioned type as "primer" or undercoater for coating a metal surface before final painting.

U.S. Pat. No.3,661,622 relates to an improvement in the use of the fat product as "primer", said improvement being attained incorporating in a major amount of said product a lower amount (0.1 to 25% by weight) of a polymer having low crystallinity rate, a molecular weight ranging from 3000 to about 1000000, high solubility in paraffin hydrocarbon solvents and belonging to terpenes, or amorphous polypropylenes, or low molecular weight polyethylenes, or ethylene-vinyl acetate class. According to the inventors, improvement lies in forming a less sticky, more adherent and more anticorrosive primer protective layer, which is applied to surfaces without any particular treatment of the same, and it may be easy coated with any usual surface paint.

U.S. Pat. No.3,746,643 claims the same fat-like composition, obtained by means of one or two steps processes, to which a microcrystalline wax in an amount ranging from 0.5 to 60 parts by weight is added The composition thus obtained can be used as component of antirust fats or formulations, and it exhibits improved properties in comparison to the formulations described in U.S. Pat. No. 3,242,079, in that films obtained therefrom are less sticky, last longer, and inhibit better rust formation.

Object of U.S. Pat. No.3,816,310 is a one step process for preparing fat-type compositions to employ as components of antirust fats or products formulations, in which the filtration step, described in Mc Millen patents, is omitted. The colloidal dispersion of alkaline-earth carbonate in oil solution of alkaline-earth sulfonate is here heated in a controlled fashion, so as to achieve the modification reaction leading to the end product of greasy consistence. Modification is achieved with the presence of water-methanol mixtures, and the heating control is indicated by the expression:

$$t = 0.75 + 1.6 \times (2.5 - m)$$

wherein t means the time (in hours) within which the reaction mixture has to be held between 50° and 100° C., and m is the molar ratio between water and calcium present as carbonate. According to said patent, total water and alcohol level used for the conversion is higher than 80% by weight, based on total weight of alkaline-earth sulfonate and carbonate.

The products described in all the patents mentioned above are actually components for preparing finished formulations employed in industry for the several purposes stated above.

One of these purposes, it being also the purpose for which the products of the present invention are actually intended, is of being applied to parts of motor vehicle body requiring severe antirust treatments.

The fat-like products described in the above mentioned patents are characterized by thixotropy, poor flowability, good resistance to corrosion due to moisture and calcium chloride, good heat stability.

However, said compositions, even though more or less substantial amounts of waxes or amorphous polymers are added thereto, exhibit notable technological and applicability restrictions when end-formulations containing them are employed to protect from rust body underlying parts, and particularly motor vehicle boxed parts. As said parts are for their own nature only hardly penetrated by antirust formulations having a given viscosity, whichever the application system utilized for said penetration may be, it results that when application is over, a given, more or less important portion of the total surface to be protected is not coated with protective layer. In these uncoated parts, rusting starts slowly its growing, and it spreads out even under the protective film where it was able to set, thus forming further rust. The above mentioned deficiencies have to be ascribed to a reduced formulation ability, and particularly to the thyxotropic and fat-like component, to freely and easy penetrate all the holes present in the boxed parts. Reduction of thixotropic compound level in end-formulations, or dilution of said formulations with several solvents to make them flowing, and therefore more penetrating and coating, provides in practice a light enhancement of the coated surface, without having yet a full coating, but also and chiefly it provides a contemporary reduction in thickness of the film which has been deposited and, consequently, a reduction of the protective strength against rust forming.

For this reason, consumers of the end-formulations which should be applied to underbody and motor vehicle boxed parts, request to purchase specification certain flowability and capillary penetration properties, which by nature correspond to maximum possibilities offered by products presently on the market. Consumers are really constantly in search of formulations having still better requirements.

A further disadvantage of the products presently on the market, is due to unhomogeneity sometimes noticeable in different lots or supplies of the thixotropic component, which is bound to viscosity values at times considerably different (for example from 200,000 to about 500,000 cps at 23° C.).

In order to respect the viscosity values of the formulations, which have been forced by consumers within sometimes rather narrow limits, producers of said formulations are therefore obliged to continuous settlements of the same.

OBJECTS

It is an object of the present invention to provide a process for preparing antirust components not having the above mentioned disadvantages; it should be moreover economically advantageous and should provide products exhibiting physical and mechanical properties better than those of known products.

These objects have been surprisingly attained by a process for preparing antirust components of polymeric nature, which process will be now described more in detail and is schematized in the appended claims.

The present invention relates therefore to a process for preparing antirust components of polymeric nature having high and controlled viscosity, and characterized by better flowability and capillary penetration properties, which are able to notably exceed in end-formulations the values requested by consumers and the values achievable with the products presently available.

It is a further object of the present invention an already painted metal part or surface to which an improved resistance to corrosion, due to rust, is conferred, said already painted metal part or surface being then fully coated with a suitable protective composition containing the antirust components obtained according to the process described below as specific antirust agents. The full coating with an antirust protective layer, is obtained by means of the improved finished formulations flowability achievable employing the products of the present invention as antirust components.

It is a further object of the present invention a full coating of painted bodies and motor vehicle boxed parts, refined by means of a suitable protective film of a composition containing a polymeric component having a strictly controlled viscosity and exhibiting notable and improved capillary penetration properties as well as improved antirust properties.

The whole coating may be achieved employing the products of the present invention as well as utilizing any method actually used for applying such antirust formulations to motor vehicle boxed parts and bodies.

SUMMARY OF THE INVENTION

The method of the present invention for preparing antirust components includes essentially the steps of:

(i) preparing a mixture comprising:

(a) a major amount of a basic homogeneous colloidal composition of an alkaline-earth carbonate in an oil-soluble emulsifying medium consisting of an alkaline-earth salt of a sulfonic and/or carboxylic acid or of any mixture thereof, of a volatile diluent or a non-volatile diluent or a mixture of volatile and non-volatile diluents;

(b) a minor amount of one or more suitable monomers for the polymerization under the conditions described in the specification;

(c) a minor amount of water, equal to or little higher than the amount of the above monomers;

(d) still a minor amount of a polymerization catalyst; and (ii) submitting then the above mixture to a polymerization reaction for obtaining the antirust polymeric desired composition, characterized by controlled viscosity and notable antirust, flowability and capillary penetration values when utilized as component of end-formulations to employ for protecting underbodies and motor vehicle boxed parts from rust, said polymeric composition consisting of a polymeric product formed in situ and uniformly distributed so as to build up the bearing "skeleton" of a basic and very viscous dispersion, in the starting emulsifying medium, of the alkaline-earth carbonate in a form which, in comparison to the starting one, changed itself during the polymerization reaction. The desired product appears to be as a homogeneous polymeric gel having a controlled viscosity higher than 100,000 cps at 23° C.

Compared to the above patents, it has been thus surprisingly found that the in situ polymer formulations in the gelified basic composition, provides a product having controlled viscosity, and above all flowability, capillary penetration, and protection against rust characteristics which are higher than those of the basic compositions prepared according to the above patents, even higher than those wherein polymers are simply and subsequently added to the reaction products.

More particularly the process of the invention comprises:

(1) mixing under stirring a composition (a) consisting of (a') an oil-soluble emulsifying agent (alkaline-earth sulfonate and/or carboxylate), (a'') a diluent, (7 10 (a''') a preformed in, and uniformly dispersed in (a') colloidal alkaline-earth carbonate, with (b) one or more organic monomers, such as acrylic acid, methacrylic acid, acrylonitrile, styrene, etc., and mixtures thereof, 15 and with (c) water.

(2) heating for about 15 minutes the mixture of (a), (b), and (c) at a temperature of about 90° C., (3) adding (d) a radicalic, organic peroxide type catalyst, (4) completing the polymerization by heating under stirring at a temperature of 100° C. for further 2.5 hours, (5) discharging the product thus obtained which can be directly employed as component of untirust already finished formulations which can be ready applied without any further treatment.

DESCRIPTION OF THE PREFERRED EMBODIMENTS

The amounts of starting materials to use for carrying out the reaction of the invention are listed in the following table.

| Starting material | % by weight | |
| --- | --- | --- |
| | Suitable | Preferred |
| (a) | 84–99 | 92–96 |
| wherein: (a') emulsifying agent | 15–25 | 19–20 |
| (a") diluent | 50–65 | 56–58 |
| (a''') carbonate | 15–20 | 17–18 |
| (b) monomers | 0.8–6 | 1–3 |
| (c) water | 0.2–10 | 3–6 |
| (d) catalyst | 0.05–1 | 0.08–0.35 |

For further clarifying the above table, it should be emphasized that there are not obligatorily strict correspondences between the amount of (a) and the amounts of (b)+(c)+(d), that is the desired product can be obtained by varying independently (a) or the sum of (b)+(c)+(d). For process convenience and pratical behavior reasons, it is instead important that the sum (b)+(c)+(d) be not higher than 35% and be preferably 10–25% by weight based on the sum of emulsifying agent and alkaline-earth carbonate present in (a). This necessity is valid both for the suitable and for the preferred percentages, and it will be more evident from the examples better illustrating the invention.

Starting material (a) may consist of a great variety of mixtures suitable for this purpose: it is only necessary that the components of said mixtures (emulsifying agent, diluent and alkaline-earth carbonate) be present at the relevant percentages reported in the previous table. The suitable mixtures for the use as starting materials of the present invention are well known to those skilled in the art, and they are object of several patents, among which one can mention for example U.S. Pat. Nos. 2,616,904; 2,971,014; 3,057,896; 4,427,559; SU patents 321,138 and 502,930; and EP patent 0084966 A3. Said patents describe only a few processes which can be utilized to disperd homogeneously a colloid alkaline-earth carbonate in an oily organic medium, and therefore they cannot be considered as limitative for the process therein described. When following the known patents, it should not be possible to obtain directly the mixtures (a) compositions referred as preferred in starting materials table, it will be always possible, by conveniently adjusting the preparation method or the final composition, to obtain the corrected ratio between the (a'), (a"), (a''') components of the desired mixtures. For the purpose of the present invention, those mixtures are preferred in which: the emulisfying agent is a calcium salt of alkyl- and/or alkylaryl-sulfonic acids, and/or of carboxylic acids; the diluent consists of the nonsulfonated part of the alkylbenzenes which can be employed as starting material for obtaining the above sulfonic acids or of the same not submitted to sulfonation alkyl benzenes, or of a mineral oil or synthetic oil or of hydrocarbons having any chemical structure containing solely carbon and hydrogen; the alkaline-earth carbonate is calcium carbonate, and it is contained in mixtures (a) in form of colloid in which the particles are widely dispersed in the organic mass and are notably small in size (well under 1 micron in diameter), so that the above mixtures appear clear and transparent to the observer. Generally the calcium carbonate containted in mixtures (a) is formed in situ by means of several procedures, some of which are described in the above cited patents. It is important to emphasize that mixtures (a) should not contain components other than those listed above, for example they must not contain alcohols nor glycols, glycol ethers, ethers or compounds having one or more alcoholic or phenolic hydroxyl groups. Mixtures (a) should not contain moreover more than 0.1% of water.

Starting material (b) consists of one or more unsatured monomers which can polymerize by reaction of the double bonds with themselves (forming homopolymers), or by an addition reaction with the double bonds of another unsatured monomer (forming copolymers). Monomers utilizable for the purposes of the present invention may be selected from monomer families comprising vinylic, styrenic, acrylic, petroleum monomers and several combinations thereof. While applicants do not intend to be bound by any theory concerning the chemical and physical mechanisms regulating the above process, it is believed that the polymerization reaction occurring at the invention conditions can be regarded as a particular case of emulsion polymerization, and therefore it has been considered as a "pseudo-emulsion" polymerization reaction.

Conditions at which the reaction occurs are such that homopolymers and/or copolymers can be obtained, which average molecular weight is consistent with the physical structure and the desired viscosity of end-compositions. Particularly, it has been experimentally found that polymerization rate depends on starting monomers concentrations; being the reaction time equal, the end-product viscosity is solely a function of monomers concentration in the reaction mixture. Should the monomers amount exceed the preferred maximum value, being otherwise reaction time and other conditions equal, products are obtained having viscosities notably higher than 500,000 cps at 23° C. This shows that by increasing the monomers amount, the modification suffered by product is inherent to the major polymer amount formed in situ, which viscosity influences determinedly the entire composition viscosity.

If the monomers amount sinks under the preferred minimum value, reaction time and other conditions being equal, products are obtained having viscosity lower than 100,000 cps at 23° C. Employing monomers in an amount corresponding to the suitable minimum percent limit, as shown in the table at a level of 0.8% by weight based on the entire reaction mixture, products are obtained having viscosity of 85,000 cps at 23° C.

The in situ polymers formation object of the present invention is thus the main cause of the transformation of the starting liquid mixture in an end-substance having fat consistence and constant viscosity values, being the employed starting materials amount and type equal.

Modifications of colloidal structure of the alkaline-earth carbonate present in starting reaction mixture, which modification nature has not been yet fully characterized, is a secondary phenomenon in order to prepare the present patent application, and it is accidentally concomitant to the "pseudo emulsion" polymerization reaction.

This clearly appears from the evidence that changes in reaction times do not correspond with substantial changes in the end-product viscosity. Increasing the reaction time well above the preferred value, no substantial change in end-viscosity has been for example observed, and this monomers amount and type and other conditions being always equal. Reaction time, it being preferably of 0.5 hours, is the time which has been found to be optimal in order to prime and bring the polymerization reaction to an end.

A further characteristic of the present invention is due to the fact that, under the above reaction conditions, and because of in situ homopolymers and/or copolymers formation which is object of the present invention, neither formation of the fluid dispersions described in U.S. Pat. Nos. 3,150,088 and 3,027,325, Mc Millen, and in Hunt, U.S. Pat. No. 3,816,310, nor of any thermoplastic substance having at first fat-type consistence, becoming after heating a fluid dispersion which cannot be again transferred in a fat-type substance by cooling, as described in Hunt, U.S. Pat. No. 3,816,310, has been observed.

The quality constancy of the product of the present invention is also attested by the surprising repeatability of the product viscosity values, noticed in several preparations carried out starting materials quality and quantity being equal, as well as being equal the other conditions characterizing the above process. Said statements will be reconfirmed in the examples further clarifying and describing the invention.

It has been found, and it will be better illustrated in the examples, that total amount of the employed monomers must be 0.8–6% by weight, based on the reaction mixture, and preferably 1–3% by weight. With said amounts, reaction temperatures ranging between 75 and 100% of the reflux temperature of reaction mass can be employed. If the reflux temperature, which is preferred, is used and reaction times not higher than three hours in total are utilized, final products may be obtained which viscosity is adjustable according to the product end-use and it is adjusted by means of amount and type of the employed monomers.

Starting material (c) has the function to bring into pseudo-emulsion conditions the surface active agent contained in (a), and referred above as to (a'), so that a medium suitable for carrying out polymerization is obtained. It has been found that if (c) is employed alone without (b), whichever the employed amounts and the reaction times may be, no change in mixture (a) viscosity can be observed.

It has been further found that if (b) is utilized in the suitable and preferred percentages and alone, without (c), the same result is achieved, that is mixture (a) maintains its own end-viscosity and no desired product is obtained. This demonstrates that the "in situ", in the particular employed reaction medium polymers formation requires the above mentioned pseudo-emulsion conditions.

It has been further found that (c) amount necessary for giving rise to polymerization is 1–6 time higher, based on the weight of the primary polymerization agent, that is based on monomer(s) (b), for convenience reasons said amount being preferably 2–4 times by weight based on (b). With convenience reasons it is meant that at polymerization end it is necessary to remove (c) for avoiding that, when emulsion balance conditions are failing, agent (c) separates from product mass by natural decantation, thus constituting a self layer and making the product unhomogeneous and therefore not suitable for the subsequent handling. Removal of (c) from product can be fully and quickly carried out by distillation. For this purpose, polymerization reactor is equipped with a condenser-separator which has the function to condense and bring the monomer vapors back in the reaction phase, and to separate (c) in the homogenization end phase.

Starting material (d), as mentioned above, is the polymerization catalyst. This is of radicalic type and is added in an amount of 6–16% by weight based on (b), and preferably in an amount of 8–12%, and few minutes after (c) addition. From this moment real polymerization starts and it is ended in 2.5 hours. While (d) is considered a catalyst in that its presence gives the energy requirements for priming the reaction, it is not a classic catalyst in that it is not recovered when the process is over, and thus it remains in the product, and moreover because it enters directly in reaction forming little by little unreactive products and defining the end phase of the polymer chain.

Consequently, (d) function is very important, and it represents the main condition for obtaining in situ polymers conferring the desired characteristics to end-product. Component (d) belongs to organic peroxides family; it may be selected among the following compounds: benzoyl peroxide, acetyl peroxide, tert.butyl-hydroperoxide and the like.

When carrying out the process object of the present invention, the mixture comprising emulsifying agent+diluent+$CaCO_3$, has been previously prepared according to one of the known methods. In the preparations carried out by the Applicant, the process described here below was preferred.

(1) Sulfonic acid has been prepared by sulfuration with oleum of an heavy alkylbenzenes mixture having a straight alkyl chain and obtained as main product in a process where in the co-product is straight dodecylbenzene for detergency.

Said process, corresponding to the process described in Italian patent 1,038,893, employs straight olefins cuts as starting materials for benzene alkylation obtained by dehydrogenation of corresponding n-olefins in a Pacol-Olex plant of U.O.P. and having the following composition:

| | |
|---|---|
| n-undecene | 19.6% |
| n-dodecene | 30.2% |
| n-tridecene | 25.3% |
| n-tetradecene | 18.0% |
| light olefins | 0.2% |
| heavy olefins | 1.0% |
| branched olefins | 3.7% |
| paraffins | 0.5% |
| aromatics | 1.4% |

Alkylation was carried out in the presence of $AlCl_3$ as catalyst and of anhydrous HCl as promoter. At the end of washing, purification and fractionation procedures, the following products have been obtained:
  5.2% light alkylbenzenes and paraffins
  18.7% straight dodecylbenzene for detergency
  76.1% heavy alkylbenzenes, employed as starting material in the sulfuration with oleum, show the following characteristics:

| | |
|---|---|
| ASTM color | 3.5+ |
| Specific gravity at 15°/15° C. | 0.855 |
| Refraction index at 20° C. | 1.4715 |
| Bromine number | 1.0 |
| Flash point, COC, °C. | 194 |
| Viscosity at 100° F., cst | 40.8 |
| Viscosity at 210° C., cst | 6.13 |
| Viscosity index | 100 |
| Average molecular weight | 400 |
| Sulfurability, % mol | above 90 |

When the above alkylbenzenes are sulfurated with oleum, a sulfonic acid having an average molecular weight of 480 and a sulfonic acid content higher than 80% is obtained, which content is reduced at ca. 60% by weight before or after sulfuration by dilution with mineral oil or hydrocarbon derivatives as stated in diluent (a″) description.

(2) The above sulfonic acid has been neutralized with calcium hydroxide having a hydrate content of at least 94%; the neutral sulfonate thus obtained is then submitted to carbonation, that is to overbasification by flowing carbonic anhydride gas in the presence of glycol as promoter and of xylene as mass viscosity reducer during reaction.

(3) The product has been then purified by centrifugation and freed from volatile components by distillation in vacuo. Its composition is allowed then to be included in the preferred percentage by weight listed in starting material table as far as mixture (a) is concerned.

As to purification step by centrifugation, it has to be noted that it is necessary to remove possible unreacted calcium hydroxide parts and impurities contained in the same starting material. Should all these impurities not be removed and the process of the present invention carried out without a purification step, an unhomogeneous end-product would be obtained in which said impurities are well visible in form of solid and pale colored particles having a more or less reduced size. When said unhomogeneous product is used for spreading homogeneous films of antirust agents on the surfaces to be protected, the above solid particles are evident and able to make unhomogeneous the protective film, so that under certain conditions they can form ready corrodible points with rust forming and growth.

(4) In overbasification reaction the molar ratio between bubbled $CO_2$ and calcium contained in overbasic end-product is 0.87:1.

(5) Molar ratio between glycol and calcium contained in overbasis end-product is 6:1.

(6) Carbonation temperature may be settled by means of exothermic system and it is allowed to rise until a maximum which is granted by the used equipment and outside dispersions. Noticed temperature is of 52°–55° C. Said maximum is then maintained during the entire carbonation by circulation of warm diathermic oil in reactor inside coil.

(7) Carbonation length ranges from at least 90 minutes to a maximum of 150 minutes. Shorter times, $CO_2$ flow being equal, do not provide the desired basicity; shorter times, $CO_2$ flow having been increased to maintain the under (4) reported molar ratio, provide a cloudy, hardly filtering and centrifugable product, which is unsuitable for the end purposes of the present invention. Longer times provide the same turbidity and difficulty in product purification and make it unusable.

The above description is given as example of Applicants conditions for preparing starting material (a). Mixture (a) may be obtained by means of any known procedure and it can be employed as starting material in the present invention provided that it contains components a′, a″, a‴ in the suitable or preferred amounts as listed in starting material table.

As mentioned above, mixture (a) is the medium in which monomer (b) polymerization is carried out. It has to be noted that, under conditions detailed in the examples, said reaction is very easy to occur. No particularly high temperatures are required, in that the reaction may be accomplished at 75° C., and preferably at 95°–100° C.; no time restrictions are requested, i.e. the reaction may be carried out at the preferred temperature ranging from at least two hours to three hours, and this without modifying the end-product characteristics. As, obviously, times should be selected in industry as short as possible, for stopping reaction it is enough to draw every now and then a sample from polymerization reactor and to check viscosity. As viscosity, as mentioned above, may be exactly settled according to the desired use of the end-composition, the reaction can be stopped as soon as the desired viscosity will be reached.

To achieve a certain viscosity rate rather than another, it depends entirely on amount and type of the monomer (b) added to mixture (a). End-composition viscosity is directly proportional to the type and amount of polymer which has been obtained, mixture (a) quality and amount being equal. The particular polymerization type, defined above as "in pseudo-emulsion", is able to provide a result depending on pseudo-emulsion balance conditions, it being the medium wherein reaction occurs; surface active agent (a′) HLB (hydrophile-lipophile balance) is influenced by the type and relative amount of diluent (a″) and basic colloidal inorganic compound (a‴), and it influences stability, type and properties of the pseudo-emulsion by it created. Surface active agent (a′) itself has a HLB varying with type, molecular weight and molecular structure of the sulfonic and/or carboxylic acid from which it arises. From what stated above, it is clear that by changing starting material (a), and being unchanged monomer (b) type and amount, it will be possible to obtain an end product having different viscosity. It will be, nevertheless, enough to carry out a few lab polymerization tests for rebalancing the exact reagents amounts and thus proceeding, without further problems, to industrial preparation, and this only checking viscosity of the product obtained in each test. This is necessary when starting material (a) is purchased from different suppliers or when the usual supplier modified in some way his manufacturing procedure.

On the ground of what has been verified in all the preparations, said quantitative settlements of the reagents are however such that they enter within the suitable or preferred percentages listed in starting material table.

To mixture (a), stirred in polymerization reactor, monomer (b) is added employing any suitable dosage or inlet system. For example, a metering pump or any system comprising the monomer automatic weighing and its conveyance in reactor may be utilized. Indifferent is also in which reactor site the monomer is introduced. Introduction length is also of no importance, but it is reasonably short. It is only necessary to take care of a right substances homogeneity in the reactor, and this can be achieved by typically stirring the mass in said step and analogously in subsequent reaction steps, as usual in all polymerization reactions.

It has been experimentally found that monomer(s) (b) may be added during mixture (a) preparation step, and particularly it (they) can be mixed with sulfonic acid before the neutralization step with calcium hydroxide. In such a case, if (b) includes an unsaturated acrylic or methacrylic type acid, it is however necessary to substantially modify the operative conditions previously described for preparing said mixture (a). The most important and critical changes relate to temperature and carbonation length, which previously it has been stated to be ranging from 52° to 55° C. and from 90 to 150 minutes. It has been found that, if said conditions are maintained in carbonation step, during subsequent removal of volatile components (promoter and xylene) by in vacuo distillation the mass undergoes a sudden and appreciable viscosity increase, and it changes into the fat-like substance which has been described in the known and already cited patents.

When processing is over and the fat product thus obtained is submitted to several technological tests, it has been ascertained that it does not correspond to the desired product; its viscosity is not constant and it changes in an inversely proportional way to distillation time and is not solely depending on monomer (b) type and amount; capillary penetration is sensibly reduced and is similar to that of known products; antirust properties are also lower than those of the improved products described in the present invention. This shows that under above carbonation conditions, if component (b) comprises an acidic substance having a vinylic unsaturation, it acts as active hydrogen containing compound and not as polymerizable monomer; It is therefore impossible to gain the ends of the present invention, and such a variant must be excluded. Results are different when carbonation time is sensibly reduced and maintained within a maximum of 20 minutes, when carbonation temperature is maintained by cooling under 50° C., and when methanol is used as carbonation promoter. In such a case, reaction proceeds usually, the component (b) containing mixture (a) is duly obtained, and component (b) present in (a) acts as a monomer in the subsequent polymerization reaction if the latter is carried out, as mentioned above, under pseudoemulsion conditions by adding water and primed by catalyst (d). In this case, the product shows the desired properties and characteristics.

Addition of (b) in mixture (a) preparation step is not, however, seen as necessarily relating to the present invention, as it relies on the in situ formation, anyhow obtained, of a polymer in mixture (a), and on the improved characteristics thus brought for the use of the products as antirust components. Therefore, coming back to description of the process according to its preferred schema, one can mention that, once monomers (b) introduction in preformed mixture (a) is ended, the reaction mass is added with water, this being the above component (c). Said addition can also be carried out by means of a metering pump or an automatic weighing system or by means of a volumetric counter, and it must occur in a reasonably short time, preferably within 5-10 minutes.

It is indifferent in which reactor site the water itself is introduced. Indifferent is also if water is introduced after monomer or monomers. It may be also introduced in advance and thus it becomes the above component (b), whereas monomer(s) is introduced successively and it becomes the socalled component (c). It is obviously possible to preform mixture (b)+(c) and introduce it all at once in reactor; no one of these changes causes different and undesired effects on the reaction and on end-product quality. For storage conveniences and dosage practicality, it is however preferable to add sequential the monomer or monomers and then water.

During the above described procedures, that is starting from introduction of mixture (a) in reactor, the reactor temperature should be maintained at such a level that the mass becomes sufficiently flowable and ready to stir, and exactly in the range of from 70° to 90° C., preferably between 75° and 85° C. To verify the right function of water, and thus whether its presence is necessary or not for the reaction herein described, the process has been experimentally carried out in absence of water but in the presence of all the other components. The starting clear and transparent reaction mass showed no change even though temperature and time have been sensibly modified (from 20° C. to reflux temperature and from at least 30 minutes to a maximum of 12 hours respectively). In other words, if components ratio remains unchanged, and in absence of water, the polymerization reaction does not occur. Only when the monomers content has been increased until 10% and the catalyst content until 1% based on the whole mass, a quick and exothermic polymerization takes place transforming the reactor content in a practically solid, absolutely non stirring mass, which is impossible to use for the purposes of the present invention.

If, at contrary, one operates in monomers absence but in the presence of water, even though its content is higher than 10% of whole mass, and temperature and time, as stated above, are comprised within very large limits, no appearance change has been observed in the starting mass. It is possible therefore to deduce that: water alone has no reactive influence; without water, monomers polymerize only when their concentration is above the energetic balance; under present process conditions, by adding water it is necessary to create pseudo-emulsion metastable conditions, in the presence of which it is possible to carry out a radicalic polymerization also at the low monomer and initiator concentrations requested for obtaining viscosities still acceptable and useful for the purposes of the products thus prepared.

After addition of component (c), which may be monomer(s) or water, the reaction mass is brought as quick as possible, and preferably in a period of at least ca. 30 minutes, at reflux temperature of from 95° C. to 100° C. By means of the condenser-separator system located at reactor head, vapors developing at reflux temperature are condensed and allowed to return to reactor.

At this point, by adding component (d), reactants addition is brought to an end. As for addition of substances (b) and (c), component (d) should be added by means of a suitable dosage system in a period of about 10 minutes and maintaining the reactor temperature at its reflux value.

For component (d) it has been also proved to be suitable to check the necessity of its use. In a test carried out in absence of the organic peroxide, by keeping all the other conditions unchanged, the above mentioned transformation of the mass into the already described fat-like substance has been noted. Also in this case, controls carried out on the obtained product have revealed deficiencies in capillary penetration and antirust properties, which are typical of products resulting from colloidal system modifications arousing by active hydrogen containing compounds.

In other words, also in this case component (b) act as acid and not as monomer. When adding of (d) is ended, the reaction is prosecuted at the reflux temperature and always by condensing the developed vapors and by returning them in the reactor in a period of maximum 3 hours, preferably in 2.5 hours. At the end of this time, the polymerization reaction is over. Temperature is then increased until 120° C. and at the same time a slight vacuum is applied to the reactor. The condenser-separator valve is contemporaneously opened, so that water, vaporized with other eventual organic vapors, for example of diluent, is condensed and separated apart and then removed. The organic substances layer, eventually recovered atop water layer as a result of condensation, is returned to reactor.

Water removal is carried out as a quickly as possible preferably in less of 1 hour, and this on the ground of plant convenience. When also this step is ended, that is when in outer collector no water but only organics coming from condensation are collected, vacuum and reactor heating are stopped and reactor content is discharged in suitable collectors for the end-product.

For handling simplicity reasons and for reducing transportation costs, it is preferable not to dilute the product. Said procedure is eventually carried out by product users, and with this product they manufacture end-formulations according to their own particular receipt which are employed as antirust for underbodies and motor vehicle boxed parts.

By this way and always in the scope of the present invention, it should be noted that for the above uses those products of the present invention were preferred containing polymers which are obtained in situ from acrylic and methacrylic acids. As well known to those skilled in the art, polyacrylates and polymethacrylates exhibit in fact a better adhesion to PVC substrates which have been previously applied to motor vehicle underbodies in order to coat them with a polymeric primer which is moderately protective and well anchored to electrophoretically treated sheets.

As hitherto only the different steps of the process of the present invention have been in detail described, it is convenient to deeply investigate the technological aspect of the products thereby obtained, so that the properties making them better to those already known appear more evident. As often mentioned above, the characteristics properties are the following: a controlled viscosity, a better flowability and capillary penetration, improved antirust properties.

As to viscosity, it should only be pointed out that, anywhere values are cited relating to said characteristic, they refer to cps values which have been associated on samples maintained at a temperature of 23° C. by means of a Brookfield torque-type viscometer with an impeller No. 6 and at a speed of 4 rpm. Use of impellers and/or different speeds will be clearly explained.

Flowability and capillary penetration have been here utilized to show two angles of a same property: it means substantially the ability exhibited by an antirust formulation, which has to be employed on underbodies and motor vehicle boxed parts, to penetrate rather inaccessible hollows and to cover their surface as full as possible. Flowability is lab tested by measuring formulation penetration under the less favourable test conditions: these are when the sole possibility of filling an empty space having reduced size for admittance, is cappillarity, which is the inherent property of the product being evaluated and typical of its rheological characteristics.

Being other formulation components equal, the products of the present invention and those cited in known patents which have been here used for comparison purposes, exhibit and grant formulation itself capillarity values which may be higher or lower. for assessing capillary penetration, the experimental values of which will be reported in illustrative examples of the invention, two different methods have been followed which are used by both the major Italian motor vehicle manufacturers for evaluating antirust formulations used by them for the above cited purposes. Both the manufacturers will be identified from now on by means of letters A and B. Manufacturer A evaluates formulations capillary penetration power according to a method comprising measuring the surface that the test product succeeded to cover during its 24 hours going up at room temperature on opposite surfaces of two well degreased metal sheets, which have been introduced in a clamp the screws of which are closed with a 0.5 N.m (0.05 Kg.m) pressure. Only one covered surface of both the sheets is evaluated, and results are given in $cm^2$. Manufactuter B evaluates capillarity by measuring the height reached in a glass capillary tube 0.48 mm in diameter by the test product on which surface said capillary tube has been vertically leaned for a period of 6 minutes. Results are given in mm.

The term "flowability" as used herein in combination with capillary penetration, should not be confused with "creep" which is another property requested by users to protective formulations for the above mentioned applications. Creep, which is measured both at room temperature and in the heat, means the shifting suffered by a protective layer which has been applied on a metal specimen, being the latter in vertical position for a certain period of time. Manufacturer A evaluates flowability on a protective, 100 microns thick film both at room temperature and at 90° C. after having kept specimens in vertical position, for 24 hours and for 30 minutes respectively. Flowability value is given in mm.

Manufacturer B accomplishes measurement with 50 and 200 thick film on painted body, prescribing that no straining occurs at 100° C. by maintaining the specimen vertical for 2 hours.

Flowability is substantially the opposite of anchorage, which is an important characteristic requested to formulations in order to have them adhere without straining to metal parts once applied thereon, whatever the shape and coated surface may be. It is a function of temperature and applied layer thickness, and it is correlated to formulation capillarity: it has been surprisingly found that in the present case both these properties (anchorage and capillarity) revealed to be contemporaneously favourable. As to the "flowability" characteristic, no difference has been at contrary noticed between products obtained according to the process here described and those obtained according to known procedures: both formulations containing them show a "zero" flowability, both at room temperature and in the heat.

Finally, as to antirust properties, it should be pointed out that they have been established according to ASTM B 117 method (saline mist corrosion test) by using standard specimens which have been coated with protective, 50 and 100 microns thick films; films have been prepared by spreading the product after plate masking with an adhesive tape along the edges. Thickness values have been measured with a still wet film. Results are given in hours, and they represent the time elapsed between test starting and the appearance of also a sole corrosion centre, the observations being accomplished with an every 24 hours specimen permanence in a standard apparatus. Results listed in the examples refer to measurements carried out by utilizing either the products as such obtained in the individual reaction tests or the finished formulations to which the acceptance specifications of the end users relate.

As to said finished formulations, both the major Italian Motor vehicle manufacturers request that they fulfil the specifications listed in the following table:

|  | UNDERBODY | | BOXED PARTS | |
| --- | --- | --- | --- | --- |
|  | Manufacturer A | Manufacturer B | Manufacturer A | Manufacturer B |
| Brookfield viscosity, cps | 4000 ± 8000 (1) | 26000 ± 1000 (2) | 6000–1000 (1) | 6000 ± 500 (2) |
| Flowability at 23 ± 2° C., mm | 2 | — | 2 | — |
| Flowability in the heat, mm | 2 (3) | none (4) | 2 (3) | none (4) |
| Capillary penetration | — | — | 50 (5) | 20 ± 2 (6) |
| Saline mist test, hours | 500 (7) | 500 (8) | 1000 (7) | 1000 (8) |

FOOTNOTES:
(1) At 23° ± 2° C. with impeller 2 and 4 rpm speed
(2) At 20° C. with impeller 5 and 10 rpm speed
(3) At 90° ± 1° C. for 30 minutes
(4) At 100° C. for 2 hours
(5) In cm$^2$
(6) In mm, with a glass capillary tube $\phi$ 0.48 mm
(7) On specimens coated with a 100 microns film
(8) On specimens coated with a 50 microns film For saline mist measurements carried out on finished formulations to which the above specifications apply, a standard formulation having the following composition (percentages are in weight) has been prepared:

| Product of the invention | 20% |
| --- | --- |
| Petrolatum | 10% |
| Bitumen | 10% |
| Hydrocarbon waxes | 10% |
| Mineral oil | 10% |
| Turpentine | 40% |

With such a formulation, by varying the mineral oil type and mineral oil and turpentine mutual ratios, viscosity requirements of all the products listed in the following table are fulfilled. Results of the accomplished measurements are listed in the examples.

For better illustrating and definitely clarifying the principle and objects of the present invention, some manufacturing processes are now described, which have not to be considered limitative as far as the procedure conditions or individual details are concerned, in that possible restrictions are only specified in the attached claims.

EXAMPLES

Example 1

In this example the preparation according to U.S. Pat. No. 3,816,310 of a product to be employed as comparison substance for the products of the present invention is reported.

Applicants' purpose was to attest that the products of the present invention exhibit an improved behavior as to capillary penetration and antirust properties. For preparation, a commercial product has been used, which was manufactured especially with the following composition:

| calcium sulfonate | 40.4% by weight |
| --- | --- |
| nonvolatile carrier material | 20.5% by weight |
| colloidal calcium carbonate | 34.6% by weight |
| basic acetic number, mg KOH/g | 395 |

After dilution with Stoddard solvent and after water and methanol addition, it can be utilized for the reaction step wherein the desired end-product is obtained. Said dilution and addition were accomplished with the following amounts.

| Purchased product | 33.5 parts by weight |
| --- | --- |
| Stoddard solvent | 33.5 parts by weight |
| water | 4.0 parts by weight |
| methanol | 20.0 parts by weight |

NOTE: For "Basic acetic number" and "Stoddard solvent" meanings see the relevant explanations reported in U.S. 20 patent cited above.

Said mixture was refluxed for 2 hours (about 58° C.). Temperature was then gradually increased until 160° C. to remove low boiling compounds, i.e. methanol and water.

The end-product thus obtained has the following analytic characteristics:

| Basic number | 199 mg KOH/g |
| --- | --- |
| Nonvolatiles content | about 50% by weight |
| Brookfield viscosity (imp. 6, speed 4) | 198,000 cps |

It has been used for comparison purposes with the products of the present invention.

Example 2

800 g of the purchased product described in Example 1 are charged in a 2 l 4-necked flask, equipped with stirrer, condenser-separator, cock funnel for reactants addition and thermometer. To employ it as starting material (a), its composition has been modified by adding a hydrocarbon diluent consisting of a commercial $C_9$–$C_{11}$ n-paraffins mixture having a distillation range of from 140° C. to 170° C., a Pensky-Martens flash point (ASTM D 93 method) of about 30° C. Correction was achieved by blending:

| commercial product | 52% by weight |
| --- | --- |
| $C_9$—$C_{11}$ n-paraffins | 48% by weight | and thus obtaining a suitable composition for use as mixture (a) having the following composition:

| (a') emulsifier | 21.0% by weight |
| --- | --- |
| (a") diluent | 61.0% by weight |

| | |
|---|---|
| (a''') calcium carbonate | 18.0% by weight |

Stirrer started up, and outer bath heating began. As thermometer in the flask reached 80°C., 14.85 g of 100% methacrylic acid were slowly added to the reactor by means of a cock funnel in 10 minutes. Under stirring and heating, 40.15 g of water were then added with funnel so as to have a 5–10 minutes dropping. AT this point the reaction mass temperature was 86° C.-88° C., and it was brought to the reflux temperature of about 100° C. in a period of 15 minutes by raising heating power. Reactants addition was then concluded by adding in less of 10 minutes 1.48 g of benzoyl peroxide. The polymerization reaction started, and it was prosecuted by further heating 2.5 hours at reflux temperature and returning in the reactor the vapors condensate developing during the heating. When the reaction was over (2.5 hours), the flask content consisted of the high viscosity polymeric product, from which the water present should be removed. This occurred by increasing temperature until 120° C. and placing the reactor under a light vacuum (residual 200 mm Hg). In the separator a lower water layer and a higher condensed diluent layer were collected. As the collected water level remained constant, heating was stopped, the reactor returned to atmospheric pressure, and under stirring for homogenizing, the collected organic layer was introduced therein. The beige colored product, having a homogeneous appearance was then discharged.

Reaction yield was practically quantitative. The analytical product characterization gave the following results:

| | |
|---|---|
| dry content | 52% by weight |
| dropping point on dry residue | higher than 180° C. |
| basic number | 218 mg KOH/g |
| Brookfield viscosity: | |
| imp. 6 speed 4 | 203,000 cps at 23° C. |
| imp. 6 speed 2 | 380,000 cps at 23° C. |

The product obtained as described above was compared for behaviour characteristics with the product obtained according to the prior art, as described in Example 1. Trimmings free, perchloroethylene degreased, phosphatized by electroplating painted, flat metal sheets, 200×100×0.8 mm in size were prepared; they were soaked in both the products.

After 24 hours drying, the film coated sheets were compared:
Product according to Example 2: transparent, flexible, adherent, dry to the touch film.
Product according to Example 3: transparent, flexible, light sticky film.

By employing other specimens described above and following the formalities established by both the main utilizing Companies, comparison tests for in saline mist strength of the products as such were accomplished and the results are listed here below:

| | Product according to | |
|---|---|---|
| | Example 2 | Example 1 |
| 50 microns film, hours | 216 | 192 |
| 50 microns film, hours | 216 | 192 |
| 100 microns film, hours | 216 | 192 |

| | Product according to | |
|---|---|---|
| | Example 2 | Example 1 |
| 100 microns film, hours | 216 | 192 |

For flowability and capillary penetration tests, the standard above mentioned antirust formulation has been used and the results read as follows:

| | Product according to | |
|---|---|---|
| | Example 2 | Example 1 |
| Flowability at room temp. | no flow. | no flow. |
| Flowability at 90° C. | no flow. | no flow. |
| Capillarity (method A), cm$^2$ | 178 | 110 |
| Viscosity at 23° C., cps | 30,500 | 25,000 |

On the ground of the above reported evaluations, product according to Example 2 provides drier films having a saline mist strength and thus an antirust power 12% higher than films obtained with known products: the end-formulations therefrom exhibit moreover a capillary penetration more than 60% higher than a formulation containing well known products. A different and more evident method for evaluating the capillary penetration results, is to report the by formulation coated for capillary specimen surface percentage; by using said system one may have:

| | Formulation with product from | |
|---|---|---|
| | Example 2 | Example 1 |
| Capillary (method A) | 89 | 55 |

It is easy to ascertain that with product of Example 2 an antirust formulation is obtained, the capillarity of which covers almost fully the specimen under test conditions, whereas the product obtained by using the composition of Example 1 covers it for about the half of its surface.

Example 3

Experiment described in Example 2 was repeated with a variant: the reaction was accomplished by using the commercial product modified as described above as mixture (a), but only water and not components (b) and (d), i.e. methacrylic acid and benzoyl peroxide, were added.

Amounts, reaction times and temperatures were as mentioned above. After 2.5 hours reflux, no modification in reactor mass appearance has been noticed. Further tests under analogous conditions, varying water amount, reaction time and temperature, provided the same result as reported in the following table:

| Test | Mixture (a) % by weight | Water % by weight | Temperature °C. | Reaction time | End-product appearance |
|---|---|---|---|---|---|
| A | 97 | 3 | reflux | 2.5 hours | liquid |
| B | 95 | 5 | 75 | 5.0 hours | " |
| C | 92 | 8 | 50 | 12.0 hours | " |
| D | 92 | 8 | reflux | 8.0 hours | " |
| E | 90 | 10 | 80 | 10.0 hours | " |
| F | 88 | 12 | reflux | 12.0 hours | " |
| G | 85 | 15 | reflux | 12.0 hours | " |

Results show that in absence of monomer and catalyst, it is impossible to obtain the desired product.

Example 4

Experiment described in Example 2 was repeated with another variant: reactants (a), (b) and (c) but not peroxide (reactant d) were employed. Amounts, temperature and reaction times were unchanged. After 2.5 hours reflux, a fat-like product having a viscosity of 201,000 cps was obtained.

On this product the most characteristic technological tests were carried out, and the following results were observed:

| Film appearance | transparent, light ticky |
|---|---|
| Saline mist strength: | |
| - 50 micron film, hours | 192 |
| - 100 micron film, hours | 192 |
| Capillary penetration, % | 53 |

This Example demonstrates that in absence of polymerization, methacrylic acid acts exclusively as a hydrogen active containing compound; the obtained product has the characteristics of the product described in previous patents.

Example 5

For further verifying the function of the reactants necessary for the present invention, a test was carried out in which to mixture (a) monomer (b) and peroxide (d) but not water were added. The reaction mass had the following composition:

| Purchased product | 500 g |
|---|---|
| $C_9$-$C_{11}$ n-paraffins | 460 g |
| methacrylic acid | 25 g |
| Benzoyl peroxide | 2.5 g |

Reactants adding was accomplished as indicated in example 2 and, analogously, reaction temperature was maintained on reaction reflux value under standard conditions, that is about 100°C. The reaction time was similarly of 2.5 hours. After this time, the reaction content exhibited no variation as compared to its starting appearance.

By varying reactants ratios, and reaction time and temperature, further analogous tests were carried out.

The obtained results are reported in the following table:

| Run | Reactants g (a) | (b) | (c) | Reaction temp. °C. | Reaction time, hours | Result |
|---|---|---|---|---|---|---|
| A | 960 | 25 | 2.5 | 20 | 12 | liquid product |
| B | 960 | 25 | 2.5 | 98 | 0.5 | " |
| C | 969 | 25 | 2.5 | 100 | 2.5 | " |
| D | 940 | 50 | 5 | 97 | 12 | ticky prod. (1) |
| E | 890 | 100 | 10 | 100 | 12 | solid mass |

(1) The brown colored and honey-like product has a viscosity of 80,000 cps.

Results confirm the necessity of water presence for forming the so-called pseudo-emulsion determining the polymerization course.

Example 6

This example illustrates a full preparation of the product by starting with sulfonic acid. An acid was used, which was obtained by sulfunating with oleum a 3:1 molar mixture of linear and branched alkylbenzenes having an average molecular weight of 350. After purification of the sulfonated mixture by removal of the free sulfuric acid formed as by-product, a sulfonic acid having the following characteristics was obtained (by testing a sample from which by distillation the sulfonation solvent was driven off):

| Weight density at 15°/15° C. | 0.98 g/ml |
|---|---|
| ATSM color (at 7% in white oil) | 3 |
| Flash point, Cleveland | 110° C. |
| Sulfonic acid | 68% by weight |
| Non-sulfonated alkylbenzenes | 32% by weight |
| Free sulfuric acid | 0.1% by weight |
| Average molecular weight | 430 |

In a 5 liters 4-necked flask, equipped with stirrer, condenser, gas inlet tube, and thermometer, 1.5 moles of said acid (100%) were charged. The flask was placed in an electrically heated bath and stirring started. Under stirring after each addition, 110 g of basic mineral oil having a viscosity of 150 SSU at 100° F., 22 moles of methanol, 10 moles of n-decane and 0.23 moles of ammonium chloride were then added. Portions-wise 6.3 moles of technical grade calcium hydrate, having a 94% purity, were then added, and when addition was over stirring was continued for further 20 minutes. Temperature increased until about 40° C., after which carbonation reaction began by insufflating 4.6 moles of carbon dioxide gas for a period of 120 minutes. The temperature raised further until alcohol reflux, and it was maintained on this value during all the reaction by plugging the heating external bath resistance in and returning in the flask the developed alcohol vapors.

At the end of carbonation heating was abruptly increased and a quick stripping of methanol and water originating from neutralization and carbonation processes was accomplished.

The reaction product consisted of about 3000 g of an overbasic cloudy dispersion having the following composition:

| calcium sulfonate | 22.2% by weight |
|---|---|
| diluent | 60.4% by weight |
| calcium carbonate | 15.1% by weight |
| sediments | 2.3% by weight |

800 g of the above cloudy dispersion were heated at about 80° C. and added with 55 g of a 27% methacrylic acid aqueous solution, which were dropped in the reactor of the type described above in a period of about 15 minutes. Slowly, 10% by weight of t-butyl hydroperoxide, based on methacrylic acid, was then added. The reactor content was then brought to reflux temperature in 15 minutes, and said temperature about 99° C.) was maintained on this value for 180 minutes. At the end of the heating, the water contained in the mass was evaporated off by operating at 125° C. and under vacuum, and in the flask 20 g of distilled off with water and non separated n-decane were added again.

The product thus obtained had the following characteristics.

| Dry content | 55% by weight |
|---|---|
| Dropping point on dry residue | above 80° C. |
| Basic number | 248 |

-continued

| Brookfield viscosity: | |
|---|---|
| - imp. 6 speed 4 | 225,000 cps at 23° C. |
| - imp. 6 speed 2 | 23° C. |
| Appearance | beige, with small white lumps |
| Film appearance on sheet | non-transparent, dry, unhomogeneity for small lumps |

A marked trend to breakthrough by protective film was noticed by carrying out tests of in saline mist protective strength on plates coated with a 50 microns thick film.

From what stated above, it is easy to deduce that by employing a technical grade lime in the overbasification reaction, an unsatisfactory product is obtained.

At contrary, good results were obtained when, after overbasification and methanol and water removal, a centrifugation or mass filtration was accomplished.

By operating in a similar manner with about 800 g of the 3000 obtained as described above, and after centrifugation carrying out the polymerization reaction according to the formalities reported above, a product was obtained, the technological and chemico-physical properties of which are as those of the product described in Example 2.

Example 7

Example 2 was repeated varying monomer (b) amount but other conditions being equal. In these experiments the catalyst was 10% of the employed monomer. Conditions and results are reported in the following table:

| Run | Monomer % on starting charge | End-product viscosity | Capillarity % (method A) on formulation |
|---|---|---|---|
| A | 0.6 | 30,000 | 58 |
| B | 0.8 | 85,000 | 64 |
| C | 1.2 | 195,000 | 80 |
| D | 1.5 | 270,000 | 87 |
| E | 1.85 | 380,000 | 89 |
| F | 2.4 | 450,000 | 84 |
| G | 3.0 | above 500,000 | 75 |
| H | 4.0 | semisolid | |

In the Table, Brookfield viscosities were determined at 23° C., using impeller 6 and speed 2.

The Table results show that viscosity of the product thus obtained is about proportional to the monomer (and catalyst) amount contained in the starting charge. It is also interesting to notice that the positive effect exerted by polymer on formulation capillarity is high in the concentration range of from 1 to about 3%, whereas it tends to decrease sensitively not only at low polymer levels but also with amounts higher than 3%. This is to impute to the fact that, in the latter case, for remaining within the viscosity limits requested by users specifications, it is necessary to decrease the product percentage in finished formulations, thus reducing the favourable influence exerted by polymer itself in order to each an improved capillarity penetration. It is also interesting to realize as the product viscosity may be obtained "to measure" by establishing in advance the monomer amount in the feed charge.

Example 8

This Example illustrates the viscosity changes, depending on monomer amount, which occurred when as starting material a mixture (a) was employed which is different from that used in the tests described in Example 7. For this purpose an overbasic dispersion was utilized, which was obtained as described in Example 6 and centrifugated.

To several portions, 800 g each, the following were respectively added:

50 g of aqueous 33% methacrylic acid solution (Run A)

55 g of aqueous 27% methacrylic acid solution (Run B)

(b 50 g of aqueous 20% methacrylic acid solution (Run C)

45 g of aqueous 11% methacrylic acid solution (Run D)

52.5 g of aqueous 24% methacrylic acid solution (Run E)

54 g of aqueous 26% methacrylic acid solution (Run F).

Each mixture corresponding to Runs from A to F was added with benzoyl peroxide in an amount of 10% by weight based on the employed monomer, then it underwent the polymerization reaction under conditions of Example 2; after water removal, operating at 23° C. with impeller 6, the product Brookfield viscosities were tested and the following results, given in cps, were obtained:

| Run | Speed 4 | Speed 2 |
|---|---|---|
| A | 250,000 | 471,250 |
| B | 221,000 | 395,000 |
| C | 43,000 | 78,500 |
| D | 10,000 | 18,000 |
| E | 121,000 | 227,400 |
| F | 190,000 | 325,000 |

Said results show that, by varying mixture (a) but monomer amount being equal, the end-product exhibits viscosities different from those reported in Example 7; viscosities are however always substantially proportional to the added monomer amounts, and in any case always controllable "a priori".

From the description of the formalities carried out in said tests, it is also possible to see that polymerization reaction runs usually even if starting materials (b) and (c) addition occurs in form of (b) in (c) solution, i.e. when it is contemporaneous for both the components.

Example 9

Experiment of Example 2 was repeated by varying also in several tests the reaction time and reflux temperature.

Other conditions were exactly the same as for Example 2.

Five tests results are listed in the Table:

| Run | Reaction time, hours | End-product viscosity, cps | Film appearance on specimens |
|---|---|---|---|
| A | 1 | 240,000 | transparent, nearly dry |
| B | 2 | 370,000 | transparent, dry |
| C | 2.5 | 380,000 | transparent, dry |
| D | 3 | 385,000 | transparent, dry |

| Run | Reaction time, hours | End-product viscosity, cps | Film appearance on specimens |
|---|---|---|---|
| E | 5 | 383,000 | transparent, dry |

Results show that polymerization length is from at least 2 hours to a maximum of about 3 hours. Shorter times provide a product not yet enough stabilized, whereas longer times are useless. Considering tests C, D and E, it should be pointed out the remarkable repeatability of product viscosity, being reactants and temperature equal.

Example 10

The tests of Example 2 was repeated but in several tests the polymerization temperature was changed. Reactants amount and type as well as heating length were the same. Temperatures used and results obtained are reported in the following Table;

| Run | Reaction temperature °C. | Product viscosity, cps | Capillarity % (method A) on formulation |
|---|---|---|---|
| A | 30 | liquid product | — |
| B | 50 | cloudy product | — |
| C | 70 | 210,000 | 71 |
| D | 90 | 376,000 | 88 |
| E | 100 | 380,000 | 89 |

Suitable temperatures for invention purposes should be therefore higher than 70° C. and preferably higher than 90° C.; in practice it is preferable to operate at reflux temperature (95°-100° C.) Starting from initial temperature, the time necessary to reach said temperature may be reduced to a minimum necessary to reach it; therefore, time is an independent variable and it may range from 15 to 30 minutes.

Example 11

In this Example the catalyst amounts have been changed (d), while conditions described in Example 2 remain unchanged.

The employed catalyst was benzyl peroxide.

| Run | Peroxide % based on monomer | Product viscosity, cps | Capillarity cm² (method A) |
|---|---|---|---|
| A | 5 | 314,000 | 129 |
| B | 10 | 380,000 | 178 |
| C | 20 | 390,000 | 169 |

Based on monomer, it appears that a catalyst amount of 10% is optimal.

Example 12

Experiment of Example 2 was repeated, with the exception that water amount was varied while all other conditions remain unchanged. In the following Table the different percentages used in each test and appearance of product thus obtained are listed.

| Run | Water % by weight based on (a) | Product viscosity, cps |
|---|---|---|
| A | 0 | liquid product |
| B | 1.8 | cloudy product |
| C | 2.5 | 97,500 |
| D | 3 | 198,000 |
| E | 5 | 199,000 |
| F | 6 | 204,000 |
| G | 10 | 176,000 |

The reported results show that optimum water amount ranges between 3 and 6% by weight, based on starting material (a) weight.

Example 13

A polymerization reaction was accomplished, in order to obtain a product in which diluent (a″) is constituted mainly of a mineral basic lub oil. For the preparation, a commercial called "ECA 8515" product has been used, the composition of which by analysis was as follows:

| | |
|---|---|
| Calcium sulfonate | 30.00% by weight |
| diluent oil | 43.25% by weight |
| colloidal calcium carbonate | 26.75% by weight |
| basic acetic number, mg KOH/g | 300 |

To lead it against to the suitable composition for use as starting material (a), it has been diluted with another mineral oil, having a viscosity of 150 SSU at 100° C., at the following proportions:

| | |
|---|---|
| ECA 8515 | 800 parts by weight |
| diluent oil | 300 parts by weight | and the following mixture has been obtained:

| | |
|---|---|
| (a′) calcium sulfonate | 21.8% by weight |
| (a″) diluent mineral oil | 58.7% by weight |
| (a‴) calcium carbonate | 19.5% by weight |

Said mixture was charged in a 4-necked flask equipped with a double screw stirrer, thermometer, condenser-separator and reactant dripping funnel. The flask was placed in an electrically heated oil bath, and the reactor content was heated at a temperature of about 85° C. 75 g of an aqueous 27% methacrylic acid solution and then, slowly, 2 g of benzoyl peroxide were then added in about 15 minutes. In 15 minutes the temperature was increased until reflux and it was maintained on this value for 150 minutes. Water was then evaporated off by reaching a temperature of 130° C. The product thus obtained, about 1100 g, had the following characteristics and properties:

| | |
|---|---|
| Color and appearance | dark beige, homogeneous |
| Dry content | 100% |
| Basic number | 215 |
| Dropping point | above 180° C. |
| Flash point, open pot | above 190° C. |
| Brookfield viscosity at 23° C. | |
| imp. 6 speed 2 | 435,000 cps |
| Saline mist strength | |
| 50 microns film | above 500 hours |
| 100 microns film | above 500 hours |

A similar product, obtained according to the process conditions reported in U.S. Pat. No. 3,816,310, Example 1, had a saline mist strength of 400 ours, both with 50 and 100 microns film. The product of the invention has therefore an antirust power about 25% higher than the power of a product obtained according to prior art.

Example 14

Several reaction tests have been carried out, employing other substances, instead of monomer (b), having also a carbon-carbon double bond and acid nature. The employed conditions were as follows:

Run A-400 g of the mixture (a) described in Example 2 were heated at 85° C. and added with a dispersion obtained by mixing 0.081 moles of crotonic acid $CH_3$—CH=CH—COOH with 1.11 moles of water. After addition of benzoyl peroxide in an amount of 10% by weight based on crotonic acid weight, the temperature was increased until 100° C. in 12 minutes and maintained for 140 minutes at said value. After removal of present water, a product having the following characteristics was obtained:

| | |
|---|---|
| Dry content | 56.9% by weight |
| Basic number | 217 |
| Brookfield viscosity | |
| imp. 6, speed 4 | 195,000 cps |
| Capillarity, % | 85 |

Run B-400 g of mixture (a) described in Example 2 were heated at 85° C. and added with 0.075 g of itaconic acid $CH_1$=C(COOH)—$CH_2$—COOH, 1.11 moles water and 10% by weight of tert.butyl hydroperoxide based on monomer weight.

Reaction was carried out as described in previous Run A, and the product thus obtained was analyzed with the following results:

| | |
|---|---|
| Dry content | 52.9% by weight |
| Basic number | 205 |
| Brookfield viscosity | |
| imp. 6, speed 4 | 102,000 cps |
| Appearance | beige colored, with small dispersed white beads |

Run C-To 400 g of mixture (a) described in the previous runs, 0.075 moles of maleic anhydride, 1.11 moles of water and 10% by weight of benzoyl peroxide based on anhydride weight were added. AT the end of the reaction carried out as described above, the following product was obtained:

| | |
|---|---|
| Dry content | 52% by weight |
| Basic number | 190 |
| Brookfield viscosity | |
| imp. 6, speed 4 | 125,000 cps |
| Appearance | beige, with small dispersed white beads |
| Dropping point | above 180° C. |
| Saline mist test | |
| 50 microns | 120 hours |
| 100 microns | 120 hours |
| Capillarity, % | 77 |
| Dry film appearance | unhomogeneous, transparent, slightly sticky. |

The three tests results described above show that utilizing acids or anhydrides in which the polymerizable bond is not strictly of vinylic type as monomers, products were obtained having appearance and characteristics not fully corresponding to the desired ones; in some case, however, a few of said characteristics are the same as those of products containing in situ formed polymers.

Example 15

Experiment of Example 2 was repeated replacing methacrylic acid. Other reactants and reaction conditions were unchanged. After water removal, the product thus obtained had a Brookfield of 250,000 cps and capillary penetration of 180 cm².

Example 16

Allowable percentage change of (b)+(c)+(d) in comparison with components (a')+(a") sum, has been evaluated by comparing, in respect to product end characteristics, some of the runs described in previous Examples, and particularly:

| | A | B | A/B % | Product viscosity, cps |
|---|---|---|---|---|
| Example 2 | 56.5 | 312 | 18 | 203,000 |
| Example 7 H | 86.5 | 312 | 27.7 | semisolid |
| Example 12 G | 96.5 | 312 | 30.9 | 176,000 |
| wherein: A = sum of amounts by weight of (b) + (c) + (d) | | | | |
| B = sum of amounts by weight of (a') + (a") | | | | |

From Table date and the analogous ones deducible from previous Examples, it is plain that (b)+(c)+(d) sum should be preferably of from about 15 to 20% by weight based on (a')+(a") sum.

Example ∫

IN two different tests the opportunity of adding monomer during mixture (a) preparation step was checked; conditions described below were followed:

| | Run A | Run B |
|---|---|---|
| Reactants (parts by weight) | | |
| 65% sulfonic acid | 312 | 312 |
| methacrylic acid | 20 | 20 |
| n-paraffins (150°-180° C.) | 430 | 430 |
| calcium hydrate, technical grade (94%) | 164 | 164 |
| methanol | 236 | 236 |
| ammonium chloride | 5 | 5 |
| gas carbonic anhydride | 65 | 65 |
| Carbonation conditions | | |
| Time, minutes | 120 | 20 |
| Temperature, °C. | 55 | 40 |
| Carbonate treatment | | |
| water and methanol stripping | yes | no |
| centrifugation | yes | no |
| Mixture (a) composition | | |
| calcium sulfonate, % by weight | 21 | |
| diluent, % by weight | 47 | |
| oil + $CaCO_3$ % by weight | 29.9 | |
| methacrylic acid, % by weight | 2.1 | |
| Polymerization | | |
| Mixture (a), g | — | 400 |
| Water, g | — | 20 |
| Benzoyl peroxide, g | — | 0.8 |
| End-product | | |
| dry content, % by weight | 52 | 53 |
| Basic number | 205 | 212 |
| Brookfield viscosity, imp.6, speed 2 | 390,000 cps | 485,000 cps |
| Film appearance on specimen | sticky | dry |
| Capillarity, % | 57 | 89 |
| Saline mist test on standard formulation: | | |
| 50 microns film, hours | 500 | above 1000 |
| 100 microns film, hours | 720 | above 1500 |

Therefore, the addition of monomer to sulfonic acid in mixture (a) preparation step is possible, if substantial changes in carbonation times and temperatures are accomplished; in the opposite case, it is not possible to obtain a suitable mixture (a) for subsequent polymerization reaction, and the carbonated and not polymerized product exhibits a quite worse practical behavior.

Example 18

The run described in Example 2 was repeated with the same reactants and under the same conditions described therein, except that water was added at 80° C. before methacrylic acid, becoming in this way component (b), and methacrylic acid subsequently at 88° C., thus becoming component (c). The product thus obtained showed a Brookfield viscosity (imp. 6, speed 4) of 200,000 cps at 23° C. and a capillarity of 173 cm$^2$. Therefore, it was similar to compound obtained according to Example 2.

Example 19

To 400 g of a mixture (a) similar to that utilized in Example 2, 7 g of methacrylic acid, 50 g of monoethylenglycol (instead of water as component (c)), and 0.7 g of benzoyl peroxide were added. After 3 hours refluxing, a high consistence mass was obtained, which after glycol removal by distillation provides a product having the following characteristics:

| Appearance | beige, homogeneous |
| --- | --- |
| Dry content | 54% |
| Basic number | 225 |
| Brookfield viscosity - imp. 6, speed 2 | 95,000 cps |
| Capillarity, % | 80 |

The Example shows that the emulsion necessary for carrying out the subsequent polymerization may be also obtained employing, instead of water, a product characterized by a certain hydroxy groups concentration. A similar run, with methanol instead of glycol, provides a liquid and thus unusable product. Nevertheless, water is preferred as component (c) in that reaction and stripping temperatures are in this case lower, and generally processing conditions are milder, thereby being possible to grant an almost entire removal thereof from desired product.

In the above Examples the main details relating to the present invention have been illustrated. Nevertheless, it should be understood that said invention is not limited by these Examples, to which quite notable changes of preparative nature might be made. Therefore, it is suitable to refer to the following claims to definitely explain the inner meaning, objects and limits of said invention.

What is claimed is:

1. A process for preparing an antirust composition for motor vehicles, said composition containing an in situ formed polymer, having a controlled and high viscosity as well as high basicity, and exhibiting good capillary penetration and rust strength, said process comprising the steps of:
    (i) preparing a reaction mass which is obtained by mixing
        (a) about 84% by weight to about 99% by weight of a preformed product containing about 15% by weight to about 25% by weight of an emulsifying agent (a'), about 50% by weight to about 65% by weight of at least one organic diluent (a") selected from the group consisting of mineral or synthetic lubricating oils or hydrocarbon solvents having a distillation range of from about 80° C. to about 300° C., and about 15% by weight to about 20% by weight of calcium carbonate preformed and uniformly dispersed in (a'), with
        (b) about 0.8% by weight to about 6% by weight of one of more ethylenically unsaturated organic monomers or petroleum type monomers, with
        (c) about 0.2% by weight to about 10% by weight of water, and with
        (d) about 0.05% by weight to about 1% by weight of an organic peroxide or hydroperoxide,
        said reaction mass containing from about 1% by weight to about 70% by weight of water based on said emulsifying agent (a') weight;
    (ii) heating said mixture of (a) and (b) to a temperature of from about 70° C. to about 85° C.;
    (iii) further heating the reaction mass, after adding components (c) and (d) to the reflux temperature ranging between about 95° C. and 100° C., said heating being carried out in less than 0.5 hours;
    (iv) maintaining said reaction mass at reflux temperature for a period of about 2-3 hours in order to accomplish the polymerization reaction of monomer (b);
    (v) heating the polymer containing end-mixture at a temperature ranging from about 110° C. to 140° C. under a vacuum of between 4 and 400 mm Hg to remove essentially all of the water present.

2. The process according to claim 1 wherein the organic diluent (a") is a hydrocarbon solvent having a distillation temperature range of from about 80° C. to about 300° C. monomer (b) is acrylic or methacrylic acid, and peroxide (d) is benzoyl peroxide or tert.butyl hydroperoxide.

3. A process for preparing an antirust composition containing an in situ formed polymer, said composition having a controlled and high viscosity high basicity, and exhibiting good capillary penetration and rust strength, which process comprises the steps of:
    (i) forming a reaction mass by mixing
        (a) about 92% by weight to about 96% by weight of a preformed product containing about 19% by weight to about 20% by weight of a calcium alkylbenezene sulfonate emulsifier (a'), about 56% by weight to about 58% by weight of an organic diluent (a") selected from the group consisting of one or more synthetic or mineral lubricating oils or hydrocarbon solvents having a distillation range of from 80° C. to about 300° C., and about 17% by weight to about 18% by weight of calcium carbonate formed and uniformly dispersed in (a'), with
        (b) about 1% by weight to about 3% by weight of one or more monomers selected from ethylenically unsaturated organic monomers and petroleum type monomers,
        (c) about 3% by weight to about 6% by weight of water, and
        (d) about 0.08% by weight to about 0.35% by weight of an organic peroxide or hydroperoxide, said reaction mass containing from 15% by weight to about 35% by weight of water based on the weight of said calcium alkyl benzenesulfonate emulsifier (a');
    (ii) heating the mixture of components (a) and (b) at a temperature of about 80° C.;

(iii) heating the reaction mass, after addition of (c) and (d) from about 80° C. to the reflux temperature ranging from about 95° C. to about 100° C. in a period of time less than about 0.5 hours;

(iv) maintaining the reflux temperature of about 95°–100° C. for about 2–3 hours in order to polymerize monomer (b) in the presence of catalyst (d) and for obtaining said polymer in situ;

(v) heating the polymer containing end-mixture at a temperature of from about 110° C. to about 140° C. and at a vacuum of between about 10–300 mm Hg in order to remove substantially all of the water present.

4. The process according to claim 3, characterized in that diluent (a″) is a hydrocarbon solvent having a distillation range of about 80°–300° C., monomer (b) is acrylic or methacrylic acid, and peroxide (d) is benzoyl peroxide or tert.butyl hydroperoxide.

5. Process according to claim 3, characterized in that the end-mixture contains an in situ formed polymer, said polymer being formed by benzoyl peroxide or tert.butyl hydroperoxide catalyzed acrylic or methacrylic acid polymerization.

6. A process according to claim 1, wherein said emulsifying agent is calcium alkylbenzenesulfonate.

7. A process according to claim 3, wherein the viscosity of the in situ formed polymer containing end-mixture is controlled by regulating the amount of monomer (b), the amount of said monomer being directly related to said viscosity.

* * * * *